United States Patent Office 3,133,856
Patented May 19, 1964

3,133,856
PROCESS FOR MODIFYING POLYSACCHARIDES AND PRODUCTS THEREOF
Wesley Brock Neely, Midland, Mich., assignor to The Dow Chemical Company, Midland, Mich., a corporation of Delaware
No Drawing. Filed Apr. 11, 1960, Ser. No. 21,116
16 Claims. (Cl. 162—157)

The present invention is concerned with polysaccharides and is directed to novel polysaccharides having desirable and useful properties and to novel processes for the preparation of the polysaccharides. In the present specification and claims the expression polysaccharide is used to designate a macromolecule composed of recurring saccharide units comprising at least 6 such units each containing from 5 to 6, inclusive, carbon atoms and characteristically linked one with another by a linkage or bonding extending from the 1-position of one such unit to the 2- or 4-position of the next such unit. This can be set forth somewhat more clearly by reference to the following structural formula for a representative saccharide unit:

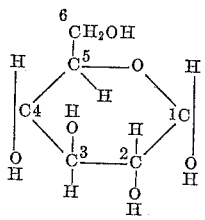

While such unit is here shown as fully hydrogenated, the linkage of a plurality which may be a very large number of such units through the hydroxyl oxygen in the 1-position with the 2- or 4-position of adjacent such unit gives rise to numerous well-known polysaccharides. In others, certain positions of such unit may bear substituents upon various positions of the saccharide nucleus.

In particular, the present invention is directed to a process which comprises subjecting a water insoluble polysaccharide to the action of dextransucrase and sucrose in aqueous medium at a pH and temperature at which dextransucrase has enzyme activity, as a result of which process there is prepared a novel glucosylated polysaccharide having useful properties. The novel glucosylated polysaccharides are predominantly randomly side-glucosylated. The expression side-glucosylated is used in the present specification and claims to designate a polysaccharide upon the backbone of linearly recurring moieties of which a glucosyl group has been attached as a side-chain.

Specifically, it has been discovered that a water-insoluble polysaccharide may be modified in a manner which produces new compositions of matter having desirable and useful properties by a process which, in one embodiment, comprises the steps of (a) contacting a water-insoluble polysaccharide and dextransucrase whereby a dextransucrase-polysaccharide complex is prepared and (b) contacting the said complex with sucrose until reaction has occurred, both steps (a) and (b) taking place in aqueous medium which does not denature the enzyme, at a pH and temperature at which the enzyme is active. As a result of such procedure, glucosyl groups from sucrose are transferred to and attached as side-chains upon the polysaccharide molecule on the said complex, in the form of carbohydrate branching extensions which do not appreciably lengthen the carbohydrate polymer chain.

The mechanism by which such transfer is effected, and the molecular structure of the resulting product are at present known in only a general way. Moreover as is common with enzyme-induced processes generally, the present process may be carried out in greater or less degree, whereby to modify the starting polysaccharide in varying degrees as desired. In any event, the products prepared in the present method are glucosylated polysaccharides, and they exhibit characteristic patterns and spectra when examined in known radiation analysis procedures such as, for example, X-ray diffraction, infrared transmission, and the like; and those which are soluble have characteristic optical rotations. In these tests and in classical methods of chemical analysis it is shown that glucosyl groups are caused to attach as side-chains to the starting polysaccharide molecules as above defined, according to the present process.

One such classical chemical test calls for the periodate oxidation of the polysaccharide. It is well known that periodate oxidation of a glucosyl moiety cleaves the ring structure and gives rise to acylic aldehydic moieties as oxidation products; these appear as side-chains upon a macromolecule. In the case of an essentially linear polysaccharide starting material, the product resulting from such cleavage is no longer essentially a polysaccharide and, upon exhaustive hydrolysis leads to the production of little or no monosaccharide. However, the presence of a side-group or side-chain such as a side glucosyl group upon the polysaccharide molecule sterically interferes with periodate cleavage and leaves the polysaccharide structure intact, despite the fact that such side group may, if susceptible, itself be cleaved by periodate attack.

Thus by the simple expedient of periodate oxidation, hydrolysis of oxidation product, and analysis of the product of hydrolysis for content of monosaccharide such as glucose, glucosamine, or the like, and comparing the results with similar results from untreated starting materials, it is possible to determine with great accuracy what proportion of glucosyl substituents are in positions as side substituents upon the polysaccharide backbone.

Both the fact and extent of reaction of polysaccharide, to accept glucosyl groups from the employed sucrose are susceptible of ready and exact determination which may, in industrial procedures, be continuous instrumental determination, by the simple expedient of analyzing for content of reducing sugars. Cleavage of the sucrose and glucosylation of the starting polysaccharide are accompanied by quantitative commensurate increase in the reaction mixture of fructose byproduct of cleavage of the glucose. In the presence of sufficient starting glucose and enzyme, the glucosylation to exhaustion can be ascertained by carrying the reaction to the point where, upon prolonged reaction time, further increase in fructose fails to take place.

The starting water-insoluble polysaccharide materials to be glucosylated according to the present invention include starch in its various forms, inulin and other hexosan and pentosan polysaccharides, glycogen, cellulose in its various forms including natural or modified fibers from vegetable sources inclusive of species of Gossypium, Linum, Boehmeria, Sanseviera, Apocynum, Abutilon, Hibiscus, Cannabis, Asclepias, Furcraea, Phormium, Crotalaria, Corchorus, Ceiba, and like sources of cellulosic fibers, cellulosic materials having relatively short fibers inclusive of bagasse, extracted cossettes, wood pulp, shredded straw, repulped paper, cotton linters, and similar essentially cellulosic substances; viscose rayon and similar regenerated cellulose materials inclusive of regenerated cellulose films, fibers, particles, cast and molded objects; partially substituted derivatives of cellulose exhibiting the essential polymeric structure of natural cellulose, such partially substituted derivatives including methyl cellulose, ethyl cellulose, carboxymethyl cellulose, carboxyethyl cellulose, cellulose esters including partially esterified cellulose acetate, cellulose butyrate, cellulose propionate, and mixed esters such as cellulose butyrate-acetate; polysaccharides containing not in excess of one nitrogen-bearing substituent per monomeric moiety, such as chitosan and chitin.

Thus it becomes apparent that the present invention produces glycosylated cellulose by a process which comprises subjecting cellulose to the action of dextransucrase and sucrose in aqueous medium at a pH and temperature at which dextransucrase has enzyme activity, to glucosylate the cellulose. The said cellulose may be finely divided cellulose, whereby there occurs the process which comprises subjecting finely divided cellulose to the action of dextransucrase and sucrose in aqueous medium at a pH and temperature at which dextransucrase has enzyme activity, and obtaining as product an aqueous colloidal suspension of glucosylated cellulose.

Similarly, glucosylated chitin is prepared by the process which comprises subjecting chitin to the action of dextransucrase and sucrose in aqueous medium at a pH and temperature at which dextransucrase has enzyme activity, to glucosylate the chitin.

Among the desirable and useful properties of at least some of the present products, not possessed by the starting polysaccharides are dispersibility in hot and cold water, and dispersibility in organic solvents, in each case as either a true solution or as a stable colloid. The novel polysaccharides, by reason of the modification brought about by the method of the present invention, exhibit resistance to attack by enzymes greater than that of the untreated polysaccharides, notably resistance against the typically hydrolytic enzymes. Acid hydrolysis is not seriously affected. Furthermore, in general, the strength such as the tensile strength of the novel products is greater than the strength of the unmodified starting polysaccharides. Yarns spun from the novel fibers are, in general, of greater strength than the yarns spun from the unmodified starting fibers; papers, dried pulp products, felts, and other such assemblages of fibers generally exhibit greater strength than similar articles composed of unmodified fibers. In particular, the cohesiveness of such felted articles is greatly increased. The novel fibers, and fibrous products which have been treated according to the present invention have capacity to absorb moisture and the like and capacity to take dye, substantially greater than the capacity of the unmodified starting fibers. The novel polysaccharides are also much more resistant to decomposition from attack by microorganisms.

It will be understood that the starting materials used in the present invention may be treated according to the novel method, in various degrees. Use of greater amounts of dextransucrase with the starting polysaccharide, and greater amounts of sucrose, result in products with more strongly defined properties than result from use of lesser amounts of such materials.

In carrying out the method of the present invention, and preparing the novel products, it is essential and critical to employ the enzyme product dextransucrase in active form. Conveniently, this may be prepared in the vital processes of *Leuconostoc mesenteroides* in the manner taught by Hehre et al. in Science, vol. 93, No. 2410, pg. 237. Modifications of the method there set forth, or other methods which produce the enzyme may also be employed. There is some difference of opinion whether dextransucrase be a single enzyme or a mixture. The present invention employs the product commonly known as dextransucrase, whatever its chemical identity.

It is not necessary, but a matter of convenience, in the practice of the present invention, to allow the art microorganism (which may be employed to produce the needed enzyme) to be present at any step of the novel process. The enzyme in active form, not the microorganism, is the necessary participant in the present process.

It is known to employ sucrose together with dextransucrase for the preparation of dextran. Sucrose together with dextransucrase is present in a treatment composition to be employed in the present method. However, it has now been discovered that the products of the present invention may be prepared, if desired, without the production of dextran, by the following hitherto unknown procedure: in carrying out the present invention, the starting insoluble polysaccharide may first be contacted with dextransucrase, whereby there is formed a complex which is a novel composition of matter consisting essentially of such polysaccharide securely bonded with dextransucrase.

It is not necessary, in the formation of such complex, that the enzyme be first separated from the culture medium or other preparation wherein it is produced. Indeed, the present invention may be practiced by contacting the high molecular weight polysaccharide with the enzyme directly in a culture medium wherein such enzyme is prepared. Because such culture medium usually contains molecular substances such as fructose, glucose, maltose, isomaltose, balactose, low molecular weight dextran and the like, which act as primers or initiators in the enzyme production of dextran chains, it is preferred to wash the said complex thoroughly to remove such primers or initiators before bringing the said complex comprising dextransucrase and insoluble polysaccharide into contact with the aqueous sucrose to be employed. The degree or extent of washing necessary will depend upon the degree to which it is desired to avoid production of dextran; but in general, it is advantageous that the washing be sufficiently complete to remove most of the molecular moieties which serve as primers or initiators in the formation of dextran.

However, it is possible, in the practice of the present invention, to prepare the present novel substances, and simultaneously to prepare dextran, thereafter separating the dextran from the substances of the present invention. Such combined method is appreciably more convenient to be carried out when the high molecular weight polysaccharide is in a solid, fibrous, largely particulate, or other easily separated form by means of which it may readily be separated from the dextran. In such instances dextran may be removed, in the form of an aqueous dispersion, by simple means such as filtration and the like, together with, if desired, washing with further water. However, when the high molecular weight polysaccharide is water-dispersible, other means of separation known in the dextran art may be employed. For example, many of the water-dispersible polysaccharides such as certain lower alkyl ethers of cellulose are soluble in various solvents at room temperature and other low temperatures whereas at temperatures near the boiling temperature of solvent, such as temperatures in the range of 80–120°, they become insoluble or nearly so. In such instances, heating the resulting preparation usually makes possible a separation by filtration. In another procedure, ethanol solvent fractionation may be employed, utilizing both the known property that dextran is relatively insoluble in ethanol and the fact that many of the newly discovered glucosylated water-dispersible polysaccharides of the present invention are relatively more soluble in ethanol. Separation may also be carried out by centrifugation.

The exact amount of the enzyme dextransucrase, as for example, its concentration or so-called titer in cultures wherein it may be prepared, or in solutions wherefrom it is employed, or in complexes together with polysaccharides whereby it is to be employed, is not critical, but may be allowed to vary within wide limits, provided other related factors may vary also. Thus, for example, when it is desired that the starting high molecular weight polysaccharide be exhaustively glucosylated in the present process as quickly as possible, it is preferred to form a complex of such polysaccharide with a relatively large amount of the enzyme. This may be accomplished by bringing the said polysaccharide into contact with a dispersion comprising the enzyme in relatively high concentration; or it may be accomplished by bringing the polysaccharide into contact with a solution comprising the enzyme in relatively low concentration but in relatively great volume in which case the high molecular weight polysaccharide appears to abstract and bind and complex with the enzyme in a concentration relatively greater than that which would be in equilibrium with the enzyme solution. In contrast, when it is desired to carry out the method of the present invention to prepare products by a somewhat less than exhaustive treatment, there may be employed polysaccharide-enzyme complexes of relatively high concentration of enzyme; but treatment may be continued for a shorter period of time. Alternatively, when complexes comprising smaller amounts of the enzyme are to be employed, the duration of treatment may be extended. In this regard, it is to be noted that, within the present state of the art, assay of the quantity of the enzyme dextransucrase present in a reaction mixture is ascertained not by determination of an absolute quantity, but rather by measurement of its activity. Thus, a description of means by which to determine the amount of enzyme, within the present state of the art, would be a description of methods of measuring the results of the activity of the enzyme under known conditions, and arbitrarily postulating an expression of strength or amount thereupon such as a dextransucrase unit. For the definition of an accepted dextransucrase unit, and methods of measuring such unit, see "Methods in Enzymology," edited by Colowich and Kaplan, published by the Academic Press, New York, 1955, volume 1, pages 178 and following, particularly page 180.

To complete the preparation of the present products, according to the novel method of the present invention, the starting polysaccharide and enzyme are brought together with sucrose. This may be carried out in successive steps with or without washing of the enzyme, polysaccharide complex; or may be carried out by simultaneous combination of the enzyme, polysaccharide, and sucrose.

It is known that the enzyme dextransucrase is much more effective in the pH range of 5.2 to 5.6 than it is at any hydrogen ion concentration outside this range. However, the enzyme usually has some activity at pH values between 4.7 and 5.9. It is usually preferred to carry out all procedures including the preparation and washing of insoluble complex and the reaction of such complex with sucrose employing solutions and other aqueous preparations adjusted to the pH range of greatest activity. The adjustment of pH may be carried out with, for example, a 0.05 molar acetate buffer. Alternatively it may be adjusted with, for example, hydrochloric acid and caustic soda. Preferably, the pH is maintained at the point at which dextransucrase is most active, approximately 5.2, during these processes. However, any pH between 4.7 and 5.9 may be employed.

It is known that the enzyme is denatured and rendered inactive for the production of dextran, by heating at temperatures not much above 30° C. However, in contrast, the present glucosylation is not inactivated at the lowest upper limit temperatures which inactivate dextran production. Temperatures much above about 40° C. usually stop the present glucosylation and should be avoided. Lower temperatures may be employed, but at temperatures much lower than about 10° C., the enzyme action becomes slow. However, some activity persists at 0° C. For these reasons, a preferred temperature range in the practice of the present invention is approximately from 10° C. to 37° C., and preferably the process is carried out at from 25° to 35° C.

It is known that the enzyme is denatured upon contact with numerous inorganic substances including acids, alkalies, certain salts; and also upon contact with numerous organic materials including many commonly employed organic solvents such as hydrocarbon solvents, chlorinated hydrocarbon solvents, some oxygen-bearing solvents inclusive of certain organic acids, ketones, and aldehydes. Therefore, as would be obvious to biochemists, it is essential and critical to carry out all procedures according to the present invention with such denaturant substances absent, or at least present in amounts so small as not to affect appreciably the activity of the enzyme. The presence of small amounts of mineral substances such as are commonly found in domestic or industrial so-called "fresh" waters including well-water does not usually destroy the effectiveness of the enzymes. However, natural water such as sea water and strong mineral waters known to contain denaturant amounts of impurities should be purified before use, or avoided. In any event, the employment of distilled water or, usually, of potable water satisfactorily avoids the problem of undesired denaturants of the dextransucrase.

Certain substances known to be used in the industrial treatment of certain high molecular weight polysaccharides also denature the enzyme dextransucrase rendering it inactive. Among such substances may be mentioned the strong acids and alkalies which are sometimes used in the treatment of starch, strong acetic and other carboxylic acids used in the esterification of cellulose; mineral salts including complex copper salts employed as solvents for cellulose and the like, sulfites used in conjunction with cellulosic materials such as wood whereby to dissolve and separate noncellulosic substances and so on. Contact of dextransucrase with these substances either in reaction mixtures or as residues upon cellulosic material is to be avoided in the practice of the present invention. However, mineral acids and alkalis are successfully used in moderate amounts to adjust the pH of the reaction mixture.

When the polysaccharide-dextransucrase complex is brought into contact with aqueous sucrose within the stated conditions, formation of the present products begins immediately. In fact, it is impossible to state any minimum duration of such contact, whereby to form the present products, some of the such products being formed and the desired properties becoming available in at least a limited degree in a matter of a very few minutes. When it is desired that the process of the present invention be carried out to exhaustion, whereby to prepare highly glucosylated polysaccharides, longer periods of time will be required. As will be understood by chemists, it is essential and critical in the conduct of the process of the present invention that any part of the complex of enzyme and polysaccharide which is to be modified by glucosylation according to the present invention be brought into contact with aqueous sucrose solution. Thus, when the treatment according to the present invention is applied to essentially impervious bodies of substantial sectional dimension, such as solid bodies of polysaccharide substance, only the portions which come into contact with both dextransucrase and aqueous sucrose are modified in the manner of the present invention. Thus, in carrying out the method of the present invention it may be desirable, in the preparation of certain products, that the polysaccharide be employed in a finely divided form. In other preparations, it may be preferred that the polysaccharide be employed in the form of fibers, or structures or assemblages comprising fibers, which have not lost their essential fibrous identity. Such fibrous assemblages include vegetable fibers, either natural or in modified form, yarns and threads prepared from such vegetable fibers, fabrics woven, knitted or felted from such fibers; paper, semi-fabricated wood pulp and the like, wood itself, in the form of logs, dimension stock, chips, excelsior, shavings or sawdust and the like.

It will also be apparent that, if desired, the treatment of difficultly permeable polysaccharide materials according to the present invention may be carried out so as to modify only defined and controlled surface areas. Thus, for example, a reconstituted cellulose film may be treated on only one surface by preparing a dextransucrase complex of such surface and employing it, if desired, as a container or portion of a container for a sucrose solution. Similarly cellulosic materials may be masked, as by covering or partially covering with a resist which may be any water-impervious material which does not initiate dextran formation and does not contribute dextransucrase denaturant substances to aqueous preparations contacting it. Such resist may be wax. The process of the present invention will thereafter take place only on areas which are not thus masked.

It is evident that the polysaccharide material to be treated according to the method of the present invention need not always be, and in the preparation of certain products preferably should not be, a chemically pure polysaccharide material. Rather, many substances which are compositions as found in or readily derived from nature may be treated in the novel process to obtain the novel products according to the present invention without purification whereby to isolate the polysaccharide substance. Among such substances are the fibrous cellulosic pappi of plants such as the Compositae, Asclepiadaceae, and the like. Thus, for illustration, when it is desired to treat wood according to the present invention, the presence by reason of natural occurrence in wood of xylose, dextrose, various low polymers of sugars and other relatively low-molecular weight substances which serve as dextran-chain-initiators in the presence of sucrose and dextransucrase may lead to the by-production of dextran which may be removed in known manners, such as, for example, by washing, leaving the wood of which the high-molecular weight polysaccharides, notably cellulose, exhibit, at least surficially, the glucosylation resulting from treatment in the novel process of the present invention. In many applications, such as making paper, byproduct dextran may be left in the resulting reaction mixture and employed together with the products of the present invention.

Thus, for further illustration, when it is desired to glucosylate finely divided cellulose to prepare a water-dispersible material adapted to be used as an adhesive, it is possible to employ, as starting material, chemically pure powdered cellulose, or alternatively, wood flour of reasonably fine particle-size.

When the high-molecular weight polysaccharide material occurs in the presence of significant and possibly objectionably large quantities of low-molecular weight substances which may act as dextran polymer chain initiators, it is sometimes desirable to deplete the quantity of such initiators, as by fermentation, as with a yeast or mold, or other known microorganism or with an enzyme produced by such microorganism, or in other ways, whereby to modify the said initiator molecules leaving materials when are either indifferent in the present process or may readily be removed by such known methods as distillation, washing, and the like.

Thus, for example, wood such as hard wood naturally containing substantial amounts of sugars whose presence would serve to initiate the growth of dextran chains in excessive competition with the transglucosylation process according to the present invention may be treated, as by fermentation with yeast, fungal mold, or in like known methods whereby to modify such initiator substance molecules converting them into alcohols, ketones, and the like compounds which may readily be removed by vaporization under gentle heat, washing, or in similar procedures.

When carrying out the present invention with the employment of a polysaccharide molecule of which the recurring saccharide groups are substituted with, for example, nitrogenous groups, one embodiment is the employment of chitin. This may be employed in any of several known forms, inclusive of the exoskeletal integument of arthropods including insects, arachnids, and such marine arthropods as *Crangon vulgaris*, the common shrimp of commerce, *Limulus polyphemus*, the king or horseshoe "crab," and the like. Another available source of aminated high molecular weight polysaccharide starting materials is to be found in the epigean sporocarps of numerous of the common macrofungi in which the substance is sometimes known as phytochitin. It will thus be evident that, according to the present invention, useful products may be made from substances hitherto of very low value or of no known value whatsoever.

The following examples illustrate the present invention but are not to be considered as limiting it.

EXAMPLE 1

*Treatment of Cotton Linters and Resulting Products*

Two samples, intended to be practically identical, were cut from adjacent areas of the same piece of commercial cotton linters paper. They were rectangular in shape and approximately 5 by 8 inches in size. These were arbitrarily numbered 1 and 2. They were weighed before treatment. Number 1 was thereafter immersed for about 10 minutes in a crude dextransucrase solution. The solution had been prepared by culturing *Leuconostoc mesenteroides* for 24 hours in a nutrient medium buffered with 0.05 molar acetate buffer to a nearly constant pH of approximately 5.2. Prior to use, the culture was centrifuged to obtin the employed solution which was essentially free of the microorganism.

As a check, paper number two was simultaneously immersed for the same period of time in a similar buffered sterile nutrient medium. Following this, both papers were treated identically, as follows: they were vigorously washed with an agitated, turbulent aqueous preparation comprising acetate buffer and at a pH of approximately 5.2, then immersed in 400 milliliters aqueous 0.05 molar acetate buffer containing 10 percent of sucrose by weight of resulting solution. This immersion was continued for 18 hours, after which each sample was removed, water washed, and dried. The resulting samples were weighed and variously tested. The results in each instance are as set forth in the following table:

TABLE 1

|  | Sample No. 1 (treated) | Sample No. 2 (check) |
|---|---|---|
| Starting weight, grams | 11.5934 | 11.9640 |
| Weight after treatment, grams | 18.4500 | 11.4467 |
| Weight change, grams | +6.8566 | −0.5173 |
| General appearance | tough fiberboard. | cheap blotter. |
| Bursting strength, pounds per square inch (repeated tests): | | |
| (a) | above 60 | 30 |
| (b) | above 60 | 29 |
| (c) | above 60 | 24.5 |
| Tensile strength, pounds per square inch (repeated tests): | | |
| (a) | 45.4 | 4.9 |
| (b) | 47.5 | 5.0 |
| (c) | 45.7 | 6.6 |
| (d) | 47.9 | 6.2 |

The sample treated according to the present invention was obviously much stiffer and stronger, and of much greater surface hardness than the untreated check.

EXAMPLE 2

*Treatment of Powdered Cellulose and Product Resulting Therefrom*

A living 24 hour culture of *Leuconostoc mesenteroides* was centrifuged and separated to prepare a cell-free extract comprising the enzyme dextransucrase. Twenty grams finely powdered cellulose was mixed and blended into 50 milliliters of the resulting extract. The mixture was stirred for a period of time at room temperature, to prepare a complex of cellulose and dextransucrase. The resulting mixture was then filtered and washed exhaustively with further successive filtrations, in 0.05 molar acetate buffer at a pH of 5.2, employing a total of 1000 milliliters of such buffer, whereby to remove low molecular weight carbohydrate dextran chain initiators, and obtain a relatively pure complex of cellulose with dextransucrase. The said complex was dispersed in 300 milliliters of 0.05 molar acetate buffer to which was added 30 grams sucrose and the resulting dispersion placed in a closed container mounted in a reciprocal shaker wherein it was shaken continuously for 24 hours at a temperature in the range of 20° to 30° C. At the end of this period, the resulting preparation was found to be an opalescent colloidal aqueous dispersion free from discrete solid particles, in contrast with the starting material wherein separate particles of powdered cellulose had been clearly visible. This dispersion comprises, in addition to acetate buffer and unhydrolyzed sucrose, a heavily glucosylated cellulose and byproduct fructose. The said solution may be employed directly in various useful ways, or may be treated to separate and purify the glucosylated cellulose product. Such product may, if desired, be thereafter re-dispersed in water readily to obtain an aqueous dispersion of the refined product. In preparation of such refined dispersions, the pH need not be controlled, as by buffering, inasmuch as control at the said pH is of importance only in maintaining the action of the said enzyme. Aqueous dispersions of the said heavily glucosylated cellulose may be employed as glues or cements for paper, fabric, leather, wood, and other relatively porous materials. In a representative operation, such dispersion was applied to the surface of a piece of common white sulphite paper and a similar piece of paper laid over it and appressed to it, whereby to bring each piece of paper intimately into contact with a very thin layer of the said dispersion therebetween. The resulting assembly was allowed to stand for a few hours to evaporate water solvent. The two pieces of paper were found to be cemented together so securely that one or both pieces were torn before they could be separated by pulling apart from the uncemented margins. Such aqueous dispersions are also useful as bodying or stiffening agents in, or as soil-resistant coatings upon, for example, textile substances wherein they may be employed in manners in which it is well known to employ, for example, starch, gums, and gelatin sizing, modified starches, and the like.

When it is desired to separate the pure product of the present example from the crude product, the crude product may be diluted with an equal portion of ethanol whereupon the product precipitates in the aqueous ethanol mixture and may be separated by filtration or preferably decantation, and the precipitate washed with further portions of ethanol which may comprise 50 percent or less water. Upon the completion of such steps of separation, purification, and subsequent vaporization of solvent to dryness, there was obtained in the present example, 25 grams of glucosylated cellulose product.

EXAMPLE 3

The present example is carried out in the manner set forth in Example 2 except that, in place of refined cellulose powder, there is employed wood flour. The polysaccharide-enzyme complex is washed with a larger amount of 0.05 molar acetate buffer at pH 5.2, employing in the present example, 5 liters. As a result of these procedures, there is obtained an aqueous dispersion comprising heavily glucosylated cellulose together with other substances naturally occurring in wood, and small amounts of dextran byproduct. The product is useful as a beater additive to enhance the body and strength of paper pulp products, and as an adhesive.

EXAMPLE 4

A commercial chitin preparation was glucosylated. The employed starting material was an off-white powdered material releasing, at least from liquid dispersion, an odor characteristic of a mixture of polyalkyl amines which may be described as "fishy." The starting material was found to contain 6.65 percent total nitrogen. This may be compared with a theoretical value of 6.9 percent theoretical nitrogen content for chitin. A 1.2 percent solution in 4 percent aqueous acetic acid, all percentages by weight, at 24° C. had a specific rotation for the D line of sodium light of minus 12.5 degrees.

Five grams of the commercial chitin material described was dispersed with stirring for two hours in a liquid obtained by vigorous centrifuging and separation of a 24 hour culture of *Leuconostoc mesenteroides*, relatively rich in the enzyme dextransucrase. Thereafter, the resulting dispersion was filtered and exhaustively washed with aqueous 0.05 molar acetate buffer at pH 5.2, whereby to remove short-chain acceptor substances such as mono- and disaccharide sugars, whose presence might subsequently be expected to initiate dextran chain formation. That portion which remained after exhaustive washing was dispersed in 100 milliliters of aqueous 0.05 molar acetate buffer solution at pH 5.2 to which was added 5 grams sucrose. The resulting dispersion was allowed to stand with stirring at a temperature in the range of 20° to 30° C. over a weekend, approximately 65 hours. During this time, portions of the sucrose reacted, releasing fructose into the remaining solution and glucosylating the chitinous material. The resulting chitin product was separated by the addition, to its aqueous dispersion in reaction mixture, of aqueous two-molar sodium hydroxide solution to raise the pH of the said mixture to a minimum value not otherwise noted, at which precipitation occurred. The precipitate was thereafter filtered and washed, dried under subatmospheric pressure and at temperatures not far above room temperature, to obtain a purified and dried glucosylated chitin product. The resulting product at 24° C., had a specific rotation for the D line of sodium light of minus 8.35°, and contained 6.2 percent total nitrogen. Such diminution of the nitrogen content corresponds to a non-nitrogenous increase in molecular weight of approximately 9 percent. In the present example, all nitrogen analyses are upon an ash-corrected basis. The resulting product of the stated preparative steps was a white or nearly white powder practically free from the "fishy" odor which characterized the starting material. The product is useful as an adhesive to bind together particulate material to prepare a pelleted agricultural product such as a herbicide comprising 2,2-dichloropropionic acid and adjuvant carbon black.

EXAMPLE 5

In the present example, a powdered fungus sporocarp material comprising phytochitin is glucosylated. The powdered starting material of the present example is prepared by drying and reducing to a fine powder epigean sporocarps of *Agaricus bisporiger*. The powdered fungal substance is treated in procedures essentially the same as those set forth in the treatment of chitin in Example 3. The resulting preparation shows a weight gain and corollary reduction of nitrogen content, indicating about 5 percent glucosylation. The resulting product is useful as an adhesive for sealing corrugated board boxes.

In another embodiment of the present invention, a fresh sporocarp of a basidiomycete fungus, in this instance *Cantharellus cibarius*, is immersed in the buffer-enzyme solution to prepare a complex of dextransucrase with the surficial regions of the sporocarp; the resulting substance is thereafter glucosylated in the indicated manner, and the resulting fungus structure is dried. As result of the surface glucosylation, the dried fungus retains nearly the form of the fresh structure, and is much better adapted than ordinary dried mushrooms to be kept in a botanical collection.

EXAMPLE 6

In procedures generally the same as those set forth in Example 1 a heavy burlap fabric, that is to say a fabric of interwoven yarn consisting essentially of cellulose bast fibers of Corchorus, is glucosylated. The resulting fabric is of greatly increased tensile strength, and therefore, bursting strength; overlapping layers of the said fabric of glucosylated cellulosic fibers are disposed within a filter press and used as a fabric for pressure filtration, to which it brings strength and related properties superior to those of untreated fabric.

EXAMPLE 7

Paper Prepared From Glocosylated Cellulose Fiber

A paper was prepared according to the present invention and tested. The procedures were as follows:

Five grams unbleached hardwood soda pulp was dispersed in fresh water and the resulting dispersion adjusted by the addition as needed, of hydrochloric acid and aqueous sodium hydroxide to prepare an aqueous paper pulp dispersion at a pH of 5.2. To the resulting dispersion was added 25 milliliters aqueous dextransucrase obtained by the centrifugal removal, from a 24 hour culture of *Leuconostoc mesenteroides*, of suspended solids including the microorganism, and 28 grams sucrose. The sucrose was stirred to dissolve it in the aqueous preparation to which water was thereafter added to obtain a total volume of 400 milliliters. The resulting preparation was then maintained at 24° C. for a period of 3 hours to carry out the glucosylation according to the present invention. The resulting paper pulp dispersion was thereafter employed in procedures old in the art to prepare a hand sheet of paper which was thereafter dried.

In procedures identical with the foregoing procedures of the present example, except that no aqueous dextransucrase preparation was employed, a check sheet of paper was also prepared and dried.

The papers were tested according to the Mullen dry burst test. The control paper burst under a load of 22 pounds per square inch whereas the paper prepared from pulp glucosylated according to the present invention burst under 40 pounds pressure per square inch, representing an increase in strength of 80 percent over the untreated paper.

EXAMPLE 8

Paper From Groundwood Pulp

A paper was prepared according to the present invention and tested. The procedures were as follows:

5 grams unbeaten poplar groundwood pulp was dispersed in fresh water and the resulting dispersion was adjusted by the addition, as needed, of hydrochloric acid and aqueous sodium hydroxide to prepare an aqueous paper pulp dispersion at a pH of 5.2. To the resulting dispersion was added 10 milliliters aqueous dextransucrase obtained by the centrifugal removal, from a 24 hour culture of *Leuconostoc mesenteroides*, of suspended solids including the microorganism. To the resulting preparation was added 20 grams sucrose. The sucrose was stirred to dissolve it in the aqueous preparation to which further water was then added to obtain a total volume of 400 milliliters at a pH of 5.3. The preparation was then maintained for a period of 24 hours at 24° C. to permit the side-glucosylation according to the present invention to proceed to a satisfactory degree. At the end of the 24 hours, the resulting dispersion was at a pH of 4.7. The resulting paper pulp dispersion was thereafter employed in procedures old in the art to prepare a hand sheet of paper which was thereafter dried.

In procedures identical with the foregoing procedures in the present example, except that no aqueous dextransucrase preparation was employed, a check hand sheet of paper was also prepared and dried. The resulting papers were of such substance that 500 rectangular sheets of 25 x 40 inch size of either sample weighed approximately 50 pounds. The papers were tested according to the Mullen dry burst test. The control paper burst under a load of 2.9 pounds per square inch whereas the paper produced according to the present invention burst under 12 pounds per square inch. This represented an increase of approximately 413 percent over the untreated paper.

I claim:
1. The process which comprises subjecting a water-insoluble polysaccharide to the action of dextransucrase and sucrose in aqueous medium at a pH and temperature at which dextransucrase has enzyme activity, to glucosylate the polysaccharide.
2. The process which comprises subjecting cellulose to the action of dextransucrase and sucrose in aqueous medium at a pH and temperature at which dextransucrase has enzyme activity, to glucosylate the cellulose.
3. The process which comprises subjecting finely divided cellulose to the action of dextransucrase and sucrose in aqueous medium at a pH and temperature at which dextransucrase has enzyme activity and obtaining an aqueous colloidal suspension of glucosylated cellulose.
4. The process which comprises subjecting chitin to the action of dextransucrase and sucrose in aqueous medium at a pH and temperature at which dextransucrase has enzyme activity, to glucosylate the chitin.
5. The process which comprises the steps of (a) contacting a water-insoluble polysaccharide with dextransucrase whereby a dextransucrase-polysaccharide complex is prepared and (b) contacting the said complex with sucrose until reaction has occurred, both the steps (a) and (b) taking place in aqueous medium which does not denature the enzyme, at a pH and temperature at which the enzyme is active.
6. The process which comprises subjecting a water-insoluble polysaccharide to the action of dextransucrase and sucrose in aqueous medium at a pH in the range of 4.7 to 5.9 and at a temperature at which dextransucrase has enzyme activity, to glucosylate the polysaccharide.
7. The process which comprises subjecting a water-insoluble polysaccharide to the action of dextransucrase and sucrose in aqueous medium at a pH at which the enzyme is active and at a temperature in the range of 0° to 40° C.
8. The process which comprises subjecting a water-insoluble polysaccharide to the action of dextransucrase and sucrose in aqueous medium at a pH in the range of 4.7 to 5.9 and at a temperature in the range of 0° to 40° C., to glucosylate the polysaccharide.
9. The process which comprises subjecting cellulose to the action of dextransucrase and sucrose in aqueous medium at a pH in the range of 4.7 to 5.9 and at a temperature in the range of 0° to 40° C. to glucosylate the cellulose.
10. The process which comprises subjecting cellulose to the action of dextransucrase and sucrose in aqueous medium at a pH in the range of 5.2 to 5.6 and at a temperature in the range of 25° to 35° C. and obtaining a glucosylated cellulose.

11. Glucosylated cellulose.
12. Glucosylated chitin.
13. A sheet comprising glucosylated cellulose fibers.
14. An adhesive of which the principal non-liquid component is a glucosylated polysaccharide of which the unglucosylated starting polysaccharide was water-insoluble.
15. Paper, a substantial proportion of the fiber content of which is glucosylated cellulose.
16. Textile fabric, a substantial proportion of the fiber content of which is glucosylated cellulose.

References Cited in the file of this patent

UNITED STATES PATENTS

| | | |
|---|---|---|
| 2,374,236 | Sulzberg | Apr. 24, 1945 |
| 2,392,258 | Owen et al. | Jan. 1, 1946 |
| 2,433,620 | Monsaert | Dec. 30, 1947 |
| 2,724,679 | Tuschiya et al. | Nov. 22, 1955 |
| 2,898,333 | Jullander | Aug. 4, 1959 |
| 2,960,620 | Ritter | Nov. 15, 1960 |

UNITED STATES PATENT OFFICE
CERTIFICATE OF CORRECTION

Patent No. 3,133,856 May 19, 1964

Wesley Brock Neely

It is hereby certified that error appears in the above numbered patent requiring correction and that the said Letters Patent should read as corrected below.

Column 14, line 9, for "2,960,620" read -- 2,960,444 --.

Signed and sealed this 18th day of August 1964.

(SEAL)
Attest:

ERNEST W. SWIDER
Attesting Officer

EDWARD J. BRENNER
Commissioner of Patents